Patented Aug. 17, 1948

2,447,234

UNITED STATES PATENT OFFICE 2,447,234

RECOVERY OF NICOTINIC ACID FROM DILUTE SOLUTIONS

Russell Tattershall Dean, Stamford, Conn., and Victor L. King and Napoleon Arthur Laury, Bound Brook, N. J., assignors to American Cyanamid Company, New York, N. Y., a corporation of Maine No Drawing. Application March 31, 1942,
Serial No. 437,016

4 Claims. (Cl. 260—295.5)

This invention relates to an improvement in the manufacture of nicotinic acid by the oxidation of nicotine with nitric acid.

Nicotinic acid has become of increasing commercial importance because the human body can synthesize one of the constituents in the vitamin B complex from it. The cheapest and most readily available source of nicotinic acid is from the nicotine in waste tobacco products but the reactions involved in the oxidation of nicotine to nicotinic acid, for example with nitric acid, are rather cumbersome to carry out. They involve a large number of different processing steps including several filtrations which produce large volumes of filtrates containing relatively small concentrations of nicotinic acid. Since these filtrates contain a relatively large total amount of nicotinic acid it is necessary to recover substantially all the nicotinic acid in the filtrates in order to render the process commercially desirable. The present invention relates particularly to an improved procedure for the recovery of nicotinic acid from these filtrates.

In the usual commercial method of manufacturing nicotinic acid from nicotine, nicotine is dissolved as nicotine nitrate in a separate tank in dilute nitric acid and a large amount of concentrated nitric acid of about 50% concentration is heated to about 95–100° C. In a large separate reaction vessel the relatively cool nicotine nitrate solution is slowly added to the hot acid over a period of about 6 to 8 hours during which time the nicotine nitrate is converted to nicotinic acid nitrate. A sufficient quantity of the concentrated nitric acid is used so that there is present in the reaction vessel from 30 mols or more of nitric acid per mol of nicotine added. The reaction vessel is then heated for a long period of about 20 hours to evaporate substantially all the residual liquid. At this point the residue is taken up in a sufficient amount of cold water to produce a nicotinic acid nitrate solution having a temperature of about 60° C., in which crystals are developed by cooling. The crystal slurry is then filtered, the filtrate being referred to as "filtrate A" for the purposes of this discussion.

The crystals of nicotinic acid nitrate are redissolved in caustic soda solution and the pH of the resulting solution is adjusted to about 5.5 which causes a solid waste material to precipitate. This waste material is filtered out and may be recovered as a by-product if so desired. The solution is again rendered basic by adding an alkali after which a small amount of sodium peroxide is added and the mixture treated with decolorizing carbon, filtered and its pH adjusted to about 3.2 to 3.5. The nicotinic acid nitrate is thereby converted to nicotinic acid, which being, substantially insoluble at this pH is precipitated. The nicotinic acid is collected on a filter, the filtrate being designated "filtrate B." The crystals of nicotinic acid are dissolved in hot water, recrystallized by cooling and collected by filtration, the filtrate comprising "filtrate C." If more than one recrystallization is carried out the filtrates may be combined.

In the usual practice "filtrate A" is evaporated, filtered, and the filtrate thrown to waste. The crystals from the filtration which comprise impure nicotinic acid nitrate are returned to the original reaction vessel and are recycled. Filtrates "B" and "C," whether combined or not, are evaporated and the crystals of nicotinic acid obtained thereby are also returned to the original reaction vessel and recirculated. Since these filtrates are very dilute, containing less than one percent of nicotinic acid, and are large in volume, the recovery of the nicotinic acid therein by evaporation as done in the commercial process requires a great deal of time and considerable apparatus. The cost of evaporating such dilute solutions is also a very appreciable factor in the overall cost of the process. But the total nicotinic acid in these solutions is sufficiently great so that it must be recovered.

In general the present invention comprises the recovery of the nicotinic acid from these solutions by precipitation. While nicotinic acid is sufficiently soluble at these concentrations so that it can be concentrated only by evaporation, certain of its metallic salts are so slightly soluble that they precipitate, even at the low concentrations present in these filtrates. The precipitated salts may be readily collected on a filter and reconverted to nicotinic acid.

Recovery of the nicotinic acid by this procedure has many advantages over recovery by evaporation. It is much quicker since the time interval required for evaporation is eliminated. Less equipment is required since the precipitation can be carried out in any desired apparatus. The expensive evaporation step is eliminated. Further, the metal used to form the insoluble salt may be recovered and reused.

While the present invention is not meant to be so limited, good results are obtained by precipitating the nicotinic acid in the form of copper or zinc salts. These metals are perhaps preferable since their nicotinates have very low solubility and produce almost complete precipitation whereas these salts with mineral acids such as sulfuric or hydrochloric are soluble, relatively inexpensive and easily available. Further, both copper and zinc form substantially insoluble hydroxides which permits their salts with nicotinic acid to be readily converted into soluble alkali metal salts by treatment with an alkali. These insoluble hydroxides are easily filtered out and recovered. Other metal salts however may be used if so desired since certain other metals, particularly the heavy metals produce relatively insoluble nicotinates.

In precipitating the salt of nicotinic acid it is well to adjust the pH of the filtrates to approximate neutrality, although it is not absolutely necessary to do so. The heavy metal may be added to the filtrates in the form of a soluble salt such as the sulfate or chloride. After the soluble salts have been added and allowed to stand for a few minutes, the pH is again adjusted to insure maximum precipitation of the nicotinate. The precipitated metal nicotinate is then filtered and the resulting mother liquor, which is practically free from nicotinic acid, may be discarded.

The insoluble metal nicotinate may then be treated to recover the nicotinic acid. The exact treatment will depend upon the particular metal which was used. Since the alkali metal nicotinates are soluble and the heavy metal hydroxides are not, a good procedure is to treat the insoluble nicotinate with a strongly alkaline solution to form a soluble nicotinate and precipitate the heavy metal, usually as an insoluble hydroxide. The insoluble metal hydroxide is filtered out and the metal regenerated as a soluble salt and reused or sold as scrap.

Although the nature of alkaline solution used to treat the insoluble metal nicotinate is not particularly critical there are certain limitations which should be observed. The alkali nicotinates such as those of sodium or potassium are soluble in water and their hydroxides may be used in the case of metals such as copper. However, some of the heavy metal hydroxides, such as that of zinc, are soluble in strong caustic alkali. Since the object of this step is to form a soluble nicotinate and an insoluble heavy metal compound, it is well to add the sodium or potassium in the form of a salt with a weak acid, such as the carbonate, rather than as the hydroxide. This is effective in producing the desired result.

Our preferred procedure after filtering out the heavy metal hydroxide is to add the filtrate, which contains the soluble alkali nicotinate, to the next batch of nicotinic acid nitrate at the time the latter is being dissolved in alkali. However, if so desired, the filtrate containing sodium nicotinate may be adjusted to a pH of 3.2 to 3.5 with nitric acid and thereby precipitate nicotinic acid which may be collected on a filter and the filtrate added to the mother liquors. The collected acid crystals may be returned without further purification to the original reaction vessel at the time the nicotinic acid nitrate is being dissolved in water or they may be purified by recrystallization and added to the final product. In the latter case, the filtrates which will contain some nicotinic acid may also be added to the mother liquors numbers 2 and 3.

This invention will be described in greater detail in conjunction with the following specific examples which are illustrative only and not meant to limit the scope of the invention.

*Example 1*

A sample of the combined "filtrates numbers 2 and 3" from a run made in a conventional manner was adjusted to a neutral pH. Enough copper sulfate solution was added such that the ratio of copper sulfate to nicotinic acid was about 1½ to 1. The mixture was allowed to stand for 5 minutes and the pH again adjusted to approximately 7.0. Copper nicotinate precipitated and was filtered out, the filtrate being discarded. The precipitate was boiled for one hour with an excess of 10% sodium hydroxide which caused a black precipitate which was filtered out and discarded. The pH of the filtrate was adjusted to 3.2 and cooled, which caused precipitation of white crystals which were collected and found to be substantially pure nicotinic acid.

*Example 2*

Another portion of the combined filtrates was treated as in Example 1 substituting zinc chloride for the copper sulfate and a 10% sodium carbonate solution for the 10% sodium hydroxide. The metal was precipitated as a white solid and was discarded. The final product was found to be substantially identical with that of Example 1.

While the present discussion has been primarily concerned with the oxidation of nicotine with nitric acid, this invention is not necessarily so limited. The dilute solutions containing nicotinic acid for example may be mother lquors from the recrystallization of nicotinic acid which was produced by other methods such as the oxidation of $\beta$-picoline with potassium permanganate. Whatever the source of the dilute solutions, the present precipitation process may advantageously be applied to the recovery of the small concentrations of nicotinic acid therein.

We claim:

1. In a batch process of manufacturing nicotinic acid comprising the steps of oxidizing nicotine to nicotinic acid nitrate with nitric acid, dissolving nicotinic acid nitrate in an alkaline solution as an alkali-metal nicotinate, acidifying the solution to precipitate nicotinic acid and purifying the nicotinic acid by crystallization in the course of which steps large volumes of filtrates containing concentrations of less than 1% of nicotinic acid are produced; the improvement which comprises the steps of collecting the filtrates, adding thereto a sufficient quantity of a soluble zinc salt to precipitate substantially all the nicotinic acid as zinc nicotinate, collecting the precipitated nicotinate, treating the zinc nicotinate with a solution of a salt of an alkali metal and a weak acid whereby a solution of an alkali-metal nicotinate and an insoluble zinc compound are produced, removing the insoluble zinc compound and adding the solution of the alkali-metal nicotinate to the alkali-metal nicotinate of the next batch.

2. In a process of recovering nicotinic acid from dilute solutions containing concentrations of less than 1% of nicotinic acid occurring in the manufacture of purified nicotinic acid, the steps of collecting the solutions, adjusting the pH of the solution to about 7.0, adding thereto at least a quantity of a soluble zinc salt equivalent to the nicotinic acid, whereby substantially all the nicotinic acid is precipitated as zinc nicotinate, again adjusting the pH to about 7.0, whereby the maximum precipitation of zinc nicotinate is produced, and collecting the precipitated zinc nicotinate.

3. In a process of recovering nicotinic acid from dilute solutions containing concentrations of less than 1% of nicotinic acid occurring in the manufacture of purified nicotinic acid, the steps of collecting the solutions, adding thereto a sufficient quantity of a soluble zinc salt to precipitate substantially all the nicotinic acid as zinc nicotinate, collecting the precipitated zinc nicotinate, treating the zinc nicotinate with a solution of a salt of an alkali-metal and a weak acid whereby a solution of an alkali-metal nicotinate and an insoluble zinc compound are produced, removing the insoluble zinc compound, acidifying the filtrate and evaporating the acidified filtrate whereby nicotinic acid is crystallized.

4. A process according to claim 3 in which the solution to be treated is brought to approximate neutrality before the addition of the zinc salt and the pH of the solution is again adjusted to about 7.0, whereby maximum precipitation of zinc nicotinate is obtained.

RUSSELL TATTERSHALL DEAN.
VICTOR L. KING.
NAPOLEON ARTHUR LAURY.

REFERENCES CITED

The following references are of record in the file of this patent:

UNITED STATES PATENTS

| Number | Name | Date |
|---|---|---|
| 2,009,043 | Dahlen | July 23, 1935 |
| 2,230,616 | Dowzard | Feb. 4, 1941 |
| 2,267,734 | Henke | Dec. 30, 1941 |
| 2,293,419 | VanEss | Aug. 18, 1942 |